United States Patent
Chae et al.

(10) Patent No.: US 11,301,673 B2
(45) Date of Patent: Apr. 12, 2022

(54) APPARATUS AND METHOD FOR CONTROLLING ELECTRONIC DEVICE

(71) Applicant: LG ELECTRONICS INC., Seoul (KR)

(72) Inventors: Yeon Kyung Chae, Incheon (KR); Dongwoo Han, Daegu (KR); Taeyup Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 16/811,723

(22) Filed: Mar. 6, 2020

(65) Prior Publication Data

US 2021/0182545 A1 Jun. 17, 2021

(30) Foreign Application Priority Data

Dec. 11, 2019 (KR) .......................... 10-2019-0164748

(51) Int. Cl.
| | |
|---|---|
| *G06K 9/00* | (2006.01) |
| *H04W 4/33* | (2018.01) |
| *G06K 9/62* | (2006.01) |

(52) U.S. Cl.
CPC ..... *G06K 9/00362* (2013.01); *G06K 9/00691* (2013.01); *G06K 9/00697* (2013.01); *G06K 9/6256* (2013.01); *H04W 4/33* (2018.02)

(58) Field of Classification Search
CPC ......... H04W 4/025; H04W 4/026; G01S 5/02; G06K 7/10; G06K 9/00771
See application file for complete search history.

(56) References Cited

U.S. PATENT DOCUMENTS

| | | | | |
|---|---|---|---|---|
| 6,637,933 B1 * | 10/2003 | Liao | ........................ | G01W 1/02 |
| | | | | 116/200 |
| 7,414,647 B2 * | 8/2008 | Kakou | ................. | H04N 5/2628 |
| | | | | 348/143 |
| 7,550,707 B2 * | 6/2009 | Hashimoto | .............. | G06K 9/20 |
| | | | | 250/221 |
| 7,642,949 B2 * | 1/2010 | Pergande | .............. | G01S 13/003 |
| | | | | 342/27 |
| 7,827,000 B2 * | 11/2010 | Stirling | ................. | A61B 5/1118 |
| | | | | 702/141 |

(Continued)

FOREIGN PATENT DOCUMENTS

KR 10-2018-0051729 A 5/2018

*Primary Examiner* — Yosef Kassa
(74) *Attorney, Agent, or Firm* — Birch, Stewart, Kolasch & Birch, LLP

(57) ABSTRACT

A method for controlling, by a controller, an electronic device is provided. The method may include: sensing, by a sensor, a first radiation signal incident on the sensor; generating, by the sensor, a first output signal based on the first radiation signal; recognizing a human body based on the first output signal; determining a position of the human body as being located in one of an indoor space or an outdoor space based on the first output signal; and generating a control signal for controlling the electronic device connected via a wired or wireless network based on the position of the human body. A learning model includes a deep neural network generated through machine learning and transmission of a control signal may be performed in an Internet of Things (IoT) environment using a 5G network.

13 Claims, 11 Drawing Sheets

(56) References Cited

U.S. PATENT DOCUMENTS

| | | | | |
|---|---|---|---|---|
| 7,843,323 | B2* | 11/2010 | Lim | G08B 21/0423 |
| | | | | 340/506 |
| 8,566,272 | B2* | 10/2013 | Fukumoto | G06N 5/02 |
| | | | | 706/54 |
| 8,718,672 | B2* | 5/2014 | Xie | H04W 4/029 |
| | | | | 455/456.1 |
| 9,299,231 | B2* | 3/2016 | McClure | G06K 9/00771 |
| 9,740,921 | B2* | 8/2017 | McClure | A01M 31/002 |
| 9,851,256 | B2* | 12/2017 | Steffanson | G01J 5/0896 |
| 2017/0046575 | A1 | 2/2017 | Zhao et al. | |

* cited by examiner

APPARATUS AND METHOD FOR CONTROLLING ELECTRONIC DEVICE

CROSS-REFERENCE TO RELATED APPLICATION

Pursuant to 35 U.S.C. § 119(a), this application claims the benefit of earlier filing date and right of priority to Korean Patent Application No. 10-2019-0164748, filed on Dec. 11, 2019 in the Republic of Korea, the contents of which are hereby incorporated by reference herein in its entirety into the present application.

BACKGROUND

1. Technical Field

The present disclosure relates to an apparatus and method for controlling an electronic device.

2. Description of Related Art

Among conventional electronic devices installed and operated in specific places, there exist electronic devices for changing an operation mode or determining whether to operate when a human body is present indoors.

Conventional electronic devices sense or recognize a human body present indoors based on a proximity sensor or a photographed image, but in specific environments, there are limitations with respect to determining whether to operate or change the operation mode of the electronic devices in the process of sensing a human body present outdoors or recognizing that the human body is positioned indoors.

For example, when a part of a wall surface in a specific space is a wall formed of glass, the conventional electronic devices may sense a human body outside the glass wall or recognize that the human body is positioned indoors.

As related art, US Patent Publication No. 2017-0046575 (hereinafter referred to as "Related Art 1") discloses "Video analysis system for energy-consuming building equipment and intelligent building management system" as a video analysis system.

The analysis system disclosed in Related Art 1 controls operation of an air conditioner in a specific space based on the number of human bodies recognized in an image, but cannot address an issue of incorrectly recognizing that a human body positioned outdoors is positioned indoors.

As another related art, Korea Patent Application Publication No. 10-2018-0051729 (hereinafter referred to as "Related Art 2") discloses an "Artificial intelligence Air conditioner and control method thereof".

Related Art 2 recognizes a type of object in an image photographed by a camera and generates a control signal based on the type of the recognized object, but cannot improve the issue of incorrectly recognizing that the human body positioned outdoors is positioned indoors.

The above-described background technology is technical information that the inventors have either held for the derivation of the present disclosure or that the inventors have acquired in the process of deriving the present disclosure. Thus, the above-described background technology cannot be regarded as known technology disclosed to the general public prior to the filing of the present application.

SUMMARY OF THE INVENTION

Embodiments of the present disclosure are directed to distinguishing a human body positioned in an indoor space, where an electronic device is installed, from a human body positioned outdoors.

Embodiments of the present disclosure are further directed to generating a signal for controlling an electronic device based on presence of a human body positioned indoors.

Embodiments of the present disclosure are further directed to providing a method and apparatus for controlling an electronic device that has been already installed in a specific place by additionally mounting the apparatus to the electronic device.

According to an embodiment of the present disclosure, there may be provided an apparatus and method for distinguishing human bodies positioned in the interior and exterior of a place where an electronic device is installed based on a signal sensed by a sensor, and controlling the electronic device based on positions of the human bodies.

According to an embodiment of the present disclosure, a malfunction of the electronic device caused by the human body positioned in the exterior of the place where the electronic device is installed may be prevented based on the signal sensed by the sensor.

According to an embodiment of the present disclosure, based on a floor model generated based on the signal sensed by the sensor, the human bodies positioned in the interior and exterior of the place where the electronic device is installed may be distinguished from each other.

A method for controlling, by a controller, an electronic device according to an embodiment of the present disclosure may include: sensing, by a sensor, a first radiation signal incident on the sensor; generating, by the sensor, a first output signal based on the first radiation signal; recognizing a human body based on the first output signal; determining a position of the human body as being located in one of an indoor space or an outdoor space based on the first output signal; and generating a control signal, for controlling the electronic device, connected via a wired or wireless network based on the position of the human body.

A controller according to another embodiment of the present disclosure may include: a sensor on which a first radiation signal is incident; a processor; and a memory electrically connected to the processor and configured to store at least one code executed by the processor. The memory may store codes configured to, when executed by the processor, cause the sensor to generate a first output signal based on the first radiation signal sensed by the sensor, and the processor to recognize a human body based on the first output signal, determine a position of the human body as being located in one of an indoor space or an outdoor space based on the first output signal, and generate a control signal for controlling an electronic device connected via a wired or wireless network based on the position of the human body.

An electronic device that forms an air flow according to another embodiment of the present disclosure may include: a blower motor configured to form an air flow, a sensor on which a first radiation signal is incident, a processor, and a memory electrically connected to the processor and configured to store at least one code executed by the processor. The memory may store codes configured to, when executed by the processor, cause the sensor to generate a first output signal based on the first radiation signal sensed by the sensor, and cause the processor to recognize a human body based on the first output signal, determine a position of the human body as being located in one of an indoor space or an outdoor space based on the first output signal, and generate a signal for controlling an operation mode relating to the blower motor or whether to operate the blower motor, based on the position of the human body.

The apparatus and method for controlling the electronic device according to embodiments of the present disclosure may control the electronic device based on the human bodies positioned in the interior and exterior of the place where the electronic device is installed, thereby reducing energy consumption caused by operation of the electronic device.

Further, the apparatus and method for controlling the electronic device according to embodiments of the present disclosure may control the electronic device based on the human bodies positioned in the interior and the exterior of the place where the electronic device is installed, thereby preventing unnecessary operation and use of the operation mode of the electronic device.

Further, the apparatus and method for controlling the electronic device according to embodiments of the present disclosure may prevent a malfunction caused by the human body positioned in the exterior of the place where the electronic device is installed.

Further, the apparatus and method for controlling the electronic device according to embodiments of the present disclosure may control the electronic device that has been already installed in a specific place with the apparatus additionally mounted in the electronic device, thereby controlling the electronic device at small extra cost.

Further, the apparatus and method for controlling the electronic device according to embodiments of the present disclosure may control the electronic device that has been already installed in a specific place with the apparatus integrally mounted in the electronic device, without changing the form of the electronic device, thereby improving overall aesthetics.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
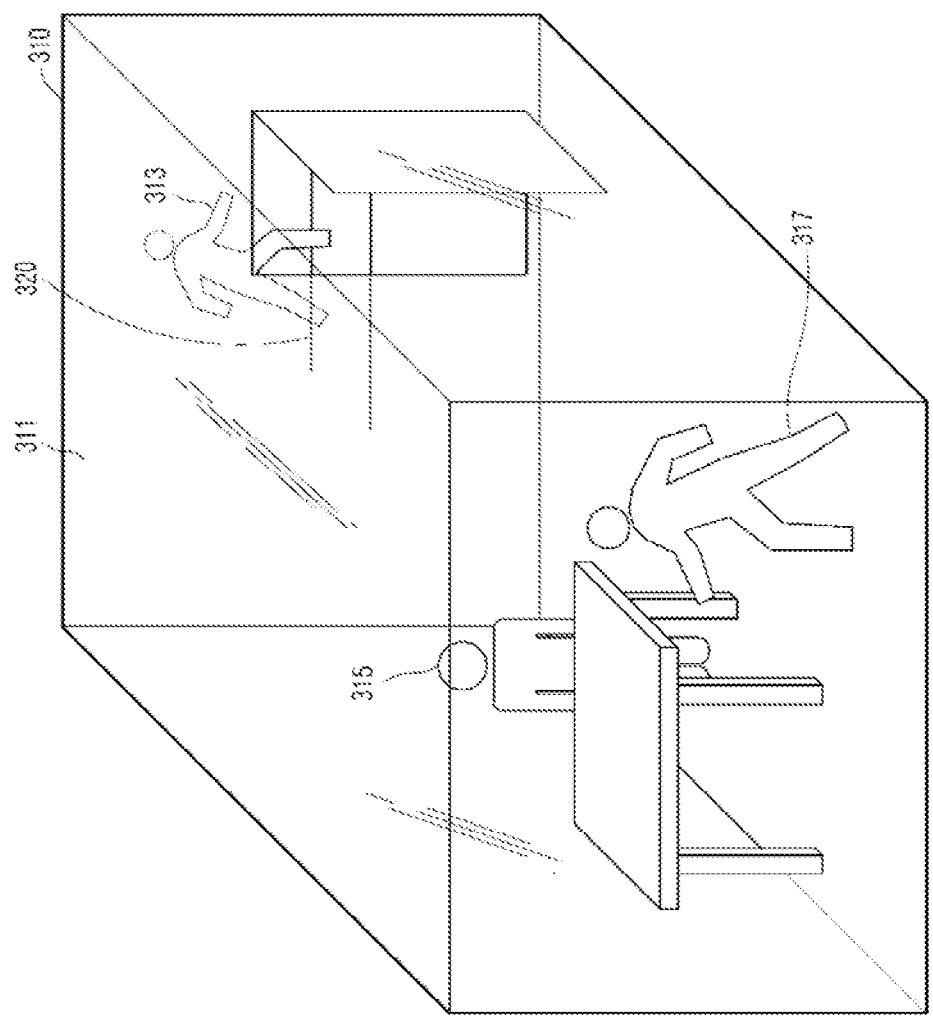
FIG. 1 is an exemplary view illustrating an environment in which a controller and method according to an embodiment of the present disclosure are implemented.
Figure 1:
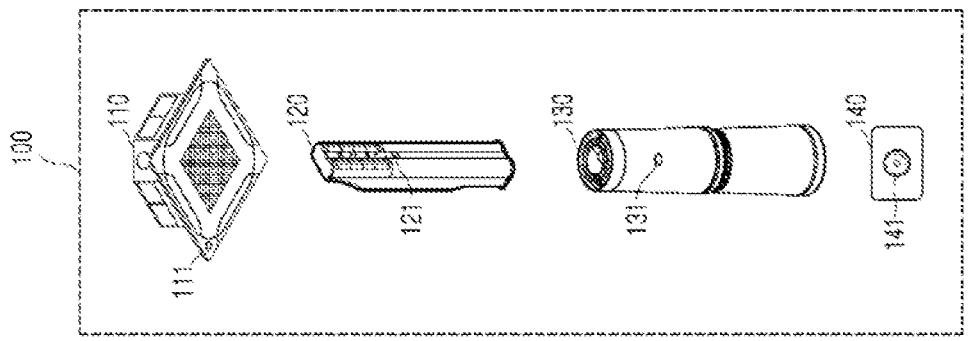

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. In relation to describing the present disclosure, when the detailed description of the relevant known technology is determined to unnecessarily obscure the gist of the present disclosure, the detailed description may be omitted. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is a diagram illustrating an environment for implementing a controller and method according to an embodiment of the present disclosure and operating the controller.

The environment for implementing the controller and method according to an embodiment of the present disclosure may include electronic devices 110, 120, and 130 controlled by the controller, and a space 310 where the electronic devices and the controller are installed.

In one embodiment, the controller may be implemented as part of the electronic devices 110, 120, and 130 controlled by the controller, or may be implemented as a separate controller 140 that controls the electronic devices 110, 120, and 130 while being connected to the electronic devices 110, 120, and 130 via a wired or wireless network.

In another embodiment, the controller may be integrally coupled to the electronic devices 110, 120, and 130 that have already been installed in a specific space 310 so as to appear as part of the electronic devices 110, 120, and 130, and will be described with reference to FIG. 4 in detail later.

When the controller is implemented as part of the electronic devices 110, 120, and 130, the controller may include sensors 111, 121, and 131. When the controller 140 is implemented separately from the electronic device, the controller 140 may be implemented with a sensor 141 included therein in the form of being installed on one wall or ceiling of a space where the electronic device is installed, or in the form of being attached to the electronic device, and a method thereof is not particularly limited.

The controller may sense human bodies 315 and 317 positioned in the interior of the installed space and a human body 313 positioned in the exterior thereof, and may determine positions of the human bodies 313, 315, and 317 as being located in one of an indoor space or an outdoor space based on output signals outputted on the basis of input signals incident on the sensors 111, 121, 131, and 141.

The controller may generate a signal for controlling operation modes or operation of the electronic devices 110, 120, and 130 based on the determined positions of the human bodies 313, 315, and 317.

When the controller is implemented separately from the electronic device, the controller may transmit the generated control signal via a wired or wireless network to the electronic devices 110, 120, and 130, or may transmit, to the electronic devices 110, 120, and 130, the generated control signal via a communication line directly connected to the electronic devices 110, 120, and 130.

Figure 2:
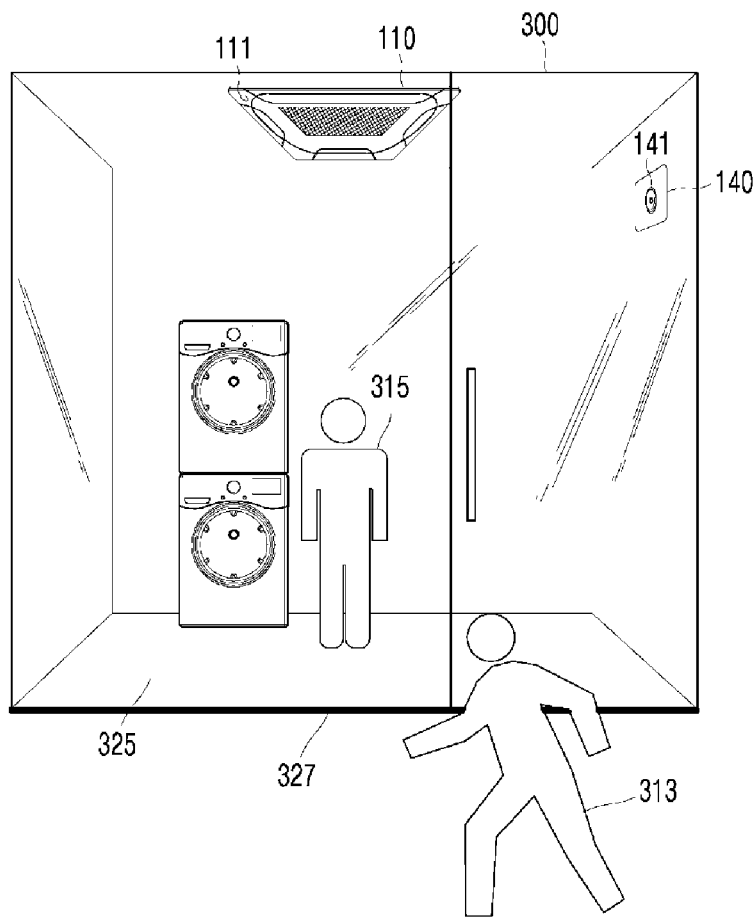
FIG. 2 is an exemplary view illustrating an environment in which a controller and method according to an embodiment of the present disclosure are implemented.

With reference to FIG. 2, a configuration in which the controller determines the positions of the human bodies 313, 315, and 317 as being located in one of an indoor space or an outdoor space based on the output signals outputted from the sensors 111, 121, 131 and 141 on the basis of the input signals incident on the sensors 111, 121, 131, and 141 will be described as an example.

FIG. 2 is an exemplary view illustrating an environment in which a controller and method according to an embodiment of the present disclosure are implemented.

In one embodiment, the controller may be implemented as the apparatus 140 separate from the electronic device 110 in a specific space where the electronic device 110 is installed, or may be implemented in the form of being integrally coupled to the electronic device 110 as part of the electronic device 110.

The controller 140 or the controller may be implemented as part of the electronic device, or the electronic device 110 integrally coupled to the controller 140 may generate output signals based on input signals incident on the sensors 111 and 141.

In one embodiment, at least one side of the space where the electronic device 110 is installed may be a wall formed of one among glass, plastic, and plywood (but not limited thereto, and the wall may be formed of any material), and the human body 313 determined to be positioned outdoors may be a human body positioned opposite the controller based on the wall.

The controller may determine the positions of the human bodies 313 and 315 as one being located in one of an indoor space or an outdoor space based on the output signals outputted from the sensors 111 and 141.

In one embodiment, the controller may determine, based on the output signals outputted from the sensors 111 and 141, a distance from the sensors 111 and 141 to the human bodies 313 and 315, compare the determined distance with a pre-stored reference value, and determine the positions of the human bodies 313 and 315 being located in one of an indoor space or an outdoor space.

In one embodiment, the controller may determine, based on the output signals outputted from the sensors 111 and 141, whether the human bodies 313 and 315 are positioned in a floor area 325 or a non-floor area of the space where the electronic device 110 is installed, and may determine the positions of the human bodies 313 and 315 as one of an indoor space or an outdoor space.

In one embodiment, the controller may determine, based on the output signals outputted from the sensors 111 and 141, whether the human bodies 313 and 315 are positioned in an inner area or an outer area of a boundary 327 of the space where the electronic device 110 is installed, and may determine the positions of the human bodies 313 and 315 as being located in one of an indoor space or an outdoor space.

In one embodiment, the controller may recognize an object by applying a machine-learning-based learning model to the output signals, recognize the human bodies 313 and 315 by identifying a type of the recognized object, and determine positions of the recognized human bodies 313 and 315 as one among the indoor space and the outdoor space. The learning model may include a deep learning-based neural network or a support vector machine (SVM) classifier.

In the present disclosure, a neural network before being trained with training data is called a learning engine, and a neural network trained with training data is called a learning model.

Machine learning is an area of artificial intelligence that includes the field of study that gives computers the capability to learn without being explicitly programmed.

Specifically, machine learning may be a technology for researching and constructing a system for learning, predicting, and improving its own performance based on empirical data and an algorithm for the same. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include, for example, a decision tree, a Bayesian network, a Support Vector Machine (SVM), and an artificial neural network (ANN).

A decision tree refers to an analysis method that uses a tree-like graph or model of decision rules to perform classification and prediction.

A Bayesian network may include a model that represents the probabilistic relationship (conditional independence) among a set of variables. A Bayesian network may be appropriate for data mining via unsupervised learning.

A SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is positioned between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

A deep neural network with a plurality of hidden layers between the input layer and the output layer may be the most representative type of artificial neural network which enables deep learning, which is one machine learning technique.

An ANN may be trained using training data. Here, the training may refer to the process of determining parameters of the ANN by using the training data, to perform tasks such as classification, regression analysis, and clustering of inputted data. Such parameters of the ANN may include synaptic weights and biases applied to neurons.

An ANN trained using training data may classify or cluster inputted data according to a pattern within the inputted data.

Throughout the present specification, an ANN trained using training data may be referred to as a trained model.

Hereinbelow, learning paradigms of an ANN will be described in detail.

Learning paradigms, in which an ANN operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an ANN may be trained with training data that has been given a label.

Here, the label may refer to a target answer (or a result value) to be guessed by the ANN when the training data is inputted to the ANN.

Throughout the present specification, the target answer (or a result value) to be guessed by the ANN when the training data is inputted may be referred to as a label or labeling data.

Throughout the present specification, assigning one or more labels to training data in order to train an ANN may be referred to as labeling the training data with labeling data.

Training data and labels corresponding to the training data together may form a single training set, and as such, they may be input to an ANN as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the ANN, a parameter of the ANN may be determined (optimized).

Unsupervised learning is a machine learning method that learns from training data that has not been given a label.

More specifically, unsupervised learning may be a training scheme that trains an ANN to discover a pattern within given training data and perform classification by using the discovered pattern, rather than by using a correlation between given training data and labels corresponding to the given training data.

Examples of unsupervised learning include, but are not limited to, clustering and independent component analysis.

Examples of ANNs using unsupervised learning include, but are not limited to, a generative adversarial network (GAN) and an autoencoder (AE).

A GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves inferring the label of unlabeled training data, and then using this inferring label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

Reinforcement Learning may be mainly performed by a Markov Decision Process (MDP).

A Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including an activation function, a loss function or cost function, a learning algorithm, an optimization algorithm, and the like. Also, the hyperparameters are set before learning, and model parameters may be set through learning to specify the architecture of the ANN.

For instance, the structure of an ANN may be determined by a number of factors, including the number of hidden layers, the number of hidden nodes included in each hidden layer, input feature vectors, target feature vectors, and the like.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and the like. Furthermore, the model parameters may include a weight between nodes, a bias between nodes, and the like.

Loss function may be used as an index (reference) in determining an optimal model parameter during the learning process of an ANN. Learning in the ANN involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an ANN rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters.

In general, the ANN is first trained by experimentally setting hyperparameters to various values, and based on the results of training, the hyperparameters may be set to optimal values that provide a stable learning rate and accuracy.

Figure 3:
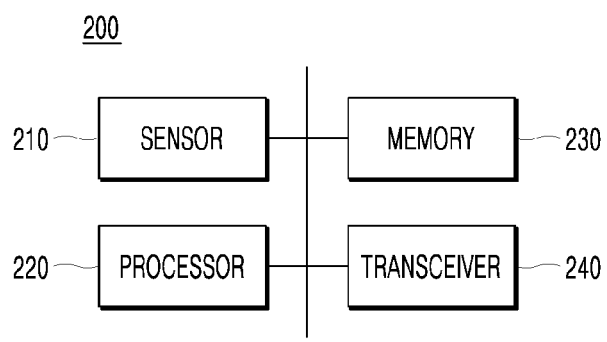
FIG. 3 is a block diagram illustrating a configuration of a controller according to an embodiment of the present disclosure.

With reference to FIG. 3, a configuration of a controller according to an embodiment of the present disclosure will be described.

When a controller 200 is implemented either separately from an electronic device to be controlled, in the form of being integrally coupled to the electronic device, or as part of the electronic device, the controller 200 may include: a sensor 210 configured to generate an output signal by sensing a radiation signal incident on a sensor; a processor 220 configured to determine a position of a human body as being located in one of an indoor space or an outdoor space based on the output signal, and generate a control signal for controlling the electronic device; a code configured to operate the processor 220; a memory 230 configured to store at least a part of calculation data of the processor 220 or at least a part of the output signal of the sensor 210; and a transceiver 240 configured to transmit the control signal to the electronic device.

In one embodiment, the sensor 210 may be a time of flight (TOF) sensor, an ultrasonic sensor, a radar sensor, a light detection and ranging (LIDAR) sensor, an infrared sensor, a thermal image sensor, or an RGB vision sensor.

In one embodiment, the sensor 210 may be an array-type sensor composed of a plurality of elements.

In one embodiment, a learning model for recognizing an object or human body, or recognizing a floor area of a space where the electronic device is installed may be mounted in the controller 200.

The trained model may be implemented by hardware, software, or a combination of hardware and software. When a part or all of the trained model is implemented by software, one or more commands which configure the learning model may be stored in the memory 230.

The transceiver 240 may include at least one of a mobile communication module, a wireless network module, or a short-range communication module.

The mobile communication module transmits and receives a radio signal to and from at least one of, for example, a base station, an external terminal, and a server on a mobile communication network established according to technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)) and 5G (Generation) communication systems.

The wireless network module, which refers to a module for wireless network connection, may be embedded in the controller 200 or embedded in the electronic device controlled by the controller. The wireless network module may be configured to transmit and receive wireless signals over a communication network that is based on wireless Internet technologies.

The wireless network technologies are, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range communication module is for short-range communication, and may support short-range communication by using at least one of Bluetooth™, Radio Frequency Identification (RFID), Infrared Data Association (IrDA), Ultra Wideband (UWB), ZigBee®, Near Field Communication (NFC), Wireless-Fidelity (Wi-Fi), Wi-Fi Direct, or Wireless Universal Serial Bus (Wireless USB) technologies.

In one embodiment, the controller 200 or the electronic device controlled by the controller 200 may include a learning processor. The learning processor may learn a model composed of ANNs by using training data.

Specifically, the learning processor repeatedly trains the ANN using the aforementioned various learning techniques to determine optimized model parameters of the ANN.

The learning model may be used to deduce a result for the new input data, rather than the training data.

The learning processor may be configured to receive, classify, store, and output information to be used for data mining, data analysis, intelligent decision making, and machine learning algorithms and techniques.

The learning processor may include one or more memory units configured to store data which is received, detected, sensed, generated, previously defined, or output by another component, device, the terminal, or a device which communicates with the terminal.

The learning processor may include a memory which is integrated with or is implemented in a terminal. In some embodiments, the learning processor may be implemented using the memory 230.

Selectively or additionally, the learning processor may be implemented using a memory, such as an external memory directly coupled to the controller 200 or the electronic device, or a memory maintained in a server.

In another embodiment, the learning processor may be implemented using a memory maintained in a cloud computing environment, or another remote memory location accessible by the controller 200 or the electronic device via a communication system such as a network.

In general, the learning processor may be configured to store data in one or more databases to identify, index, categorize, manipulate, store, search, and output data in order to be used for supervised or non-supervised learning, data mining, predictive analysis, or used in the other machine. Here, the database may be implemented using the memory 230, a memory of the learning device, a memory maintained in a cloud computing environment or other remote memory locations accessible by the terminal through a communication method such as a network.

Information stored in the learning processor may be used by the processor 220, the controller 200, or one or more other controllers of the electronic device, using any of a variety of different types of data analysis algorithms and machine learning algorithms.

As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processor 220 may determine or predict at least one executable operation of the terminal based on information which is determined or generated using the data analysis and the machine learning algorithm. To this end, the processor 220 may request, search, receive, or utilize the data of the learning processor and control the terminal to execute a predicted operation or a desired operation among the at least one executable operation.

The processor 220 may perform various functions to implement intelligent emulation (that is, a knowledge based system, an inference system, and a knowledge acquisition system). This may be applied to various types of systems (for example, fuzzy logic systems) including, for example, adaptive systems, machine learning systems, and ANNs.

The processor 220 may include sub modules which enable operations involving speech and natural language speech processing, such as an I/O processing module, an environmental condition module, a speech to text (STT) processing module, a natural language processing module, a workflow processing module, and a service processing module.

The sub modules may have an access to one or more systems or data and a model, or a subset or a super set thereof in the terminal. Further, each of the sub modules may provide various functions including a glossarial index, user data, a workflow model, a service model, and an automatic speech recognition (ASR) system.

According to another embodiment, another aspect of the processor 220 or the controller 200 may be implemented by the above-described sub module, a system, data, and a model.

In order to collect information for processing and storage in the learning processor, the processor 220 may be configured to collect, sense, extract, detect and/or receive a signal or data used for data analysis and a machine learning operation through one or more sensing components in the controller 200 or electronic device.

The information collection may include sensing information by a sensor, extracting of information stored in the memory 230, or receiving information from other equipment, an entity, or an external storage device through a transceiver.

The processor 220 may collect usage history information from the controller 200 or electronic device to store the usage history information in the memory 230.

The processor 220 may determine best matching to execute a specific function using stored usage history information and predictive modeling.

The processor 220 may receive or sense surrounding environment information or other information through the sensor 210.

The processor 220 may receive a wireless signal and wireless data through the transceiver 240.

When an operation of the controller 200 or electronic device is determined based on data analysis, a machine learning algorithm, and technology, the processor 220 may control components of the controller 200 to execute the determined operation. In addition, the processor 220 may control the controller 200 according to a control command to perform the determined operation.

When a specific operation is performed, the processor 220 may analyze history information indicating execution of the specific operation through the data analysis, the machine learning algorithm, and the technology, and may update the information which is previously learned based on the analyzed information.

Therefore, the processor 220 may improve precision of a future performance of the data analysis, the machine learning algorithm, and the technology based on the updated information, together with the learning processor.

The memory 230 may store data supporting various functions of the controller 200.

The memory 230 may store multiple application programs or applications driven by the controller 200, data and commands for the operation of the controller 200, and data for the operation of the learning processor (for example, at least one piece of algorithm information for machine learning).

The memory 230 may store a model learned by the learning processor or learning device.

If necessary, the memory 230 may store the trained model by dividing the model into a plurality of versions depending on a training timing or a training progress.

In this case, the memory 230 may store input data obtained from the input interface, learning data (or training data) used for model learning, a learning history of the model, and the like.

In this case, the input data stored in the memory 230 may be not only data which is processed to be suitable for the model learning, but may also itself be unprocessed input data.

In addition to the operation related to the application program, the processor 220 may generally control the overall operation of the controller 200. The processor 220 may process a signal, data, or information which is inputted or outputted through the above-described components, or drive the application programs stored in the memory 230, so as to provide or process appropriate information or functions to the user.

Further, in order to drive the application program stored in the memory 230, the processor 220 may control at least some of components described with reference to FIG. 3. Moreover, the processor 220 may combine and operate at least two of components included in the controller 200 to drive the application program.

As described above, the processor 220 may control an operation related to the application program, and may generally control the overall operation of the controller 200.

Figure 4:
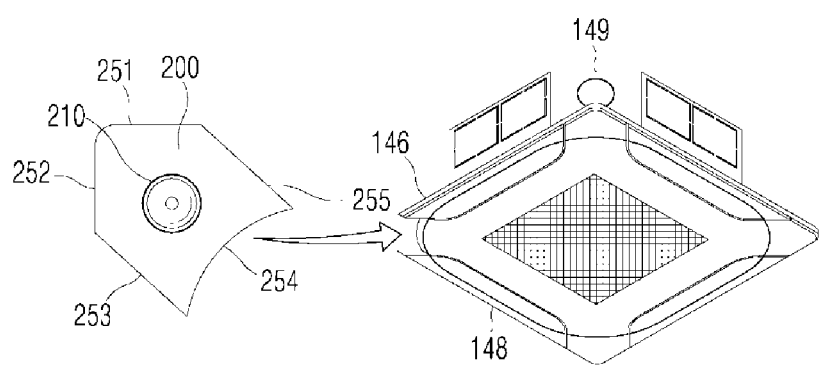
FIG. 4 is a diagram illustrating a controller according to an embodiment of the present disclosure.

With reference to FIG. 4, a case in which the controller 200 is implemented as part of an electronic device to be controlled or implemented to be integrated with the electronic device will be described.

The electronic device to be controlled may be an air conditioner, and the controller may be implemented as part of an indoor unit of the air conditioner, or may be implemented to be integrally coupled to the indoor unit.

In one embodiment, when the controller 200 is implemented as part of the indoor unit 149 implemented to be installed on the ceiling of the air conditioner, or is implemented to be integrally coupled to the indoor unit 149, the sensor 210 of the controller 200 may generate an image signal of a bird's-eye view as an output signal in response to a radiation signal incident via a wide-angle lens of the sensor. The processor 220 of the controller 200 may recognize, based on the output signal that is the image signal of the bird's-eye view, a floor area of a space where the indoor unit 149 is installed, and may generate a floor model based on the recognized floor area. The processor 220 may determine, based on the floor model, positions of human bodies positioned in the interior and exterior of the space where the indoor unit 149 is installed.

The floor model may be a model in which the floor area recognized by the processor 220 on the basis of the output signal is stored as an image or a mask-type image, or may be a mask-type image obtained by expanding the floor area recognized by the processor 220 on the basis of the output signal through post-processing. A method for expanding the floor area recognized by the processor 220 based on the output signal through post-processing will be described below in detail with reference to FIG. 8.

In one embodiment, when the controller 200 is implemented as part of the indoor unit 149 implemented to be installed on the ceiling of the air conditioner, or is implemented to be integrally coupled to the indoor unit 149, the controller 200 may be formed to have a circumference including five interconnected faces 251, 252, 253, 254, and 255, and the longitudinal extension lines of two adjacent faces 251, 252 among the five faces 251, 252, 253, 254, and 255 may be perpendicular to each other.

In one embodiment, when the controller 200 is implemented as part of the indoor unit 149 implemented to be installed on the ceiling of the air conditioner, or is implemented to be integrally coupled to the indoor unit 149, the controller may include a communication line configured to transmit a control signal generated based on the position of the human body to the electronic device, and a connector formed at one end of the communication line. The processor 220 may control the transceiver 240 to transmit a control signal via the communication line to the indoor unit 149 connected to the connector.

In one embodiment, when the controller 200 is implemented as part of the indoor unit 149 implemented to be installed on the ceiling of the air conditioner, or is implemented to be integrally coupled to the indoor unit 149, the mutually-perpendicular longitudinal extension lines of the two adjacent surfaces 251 and 252 among the five surfaces 251, 252, 253, 254 and 255 forming the circumference of the controller 200 may be mechanically coupled to the indoor unit 149 through a coupler to coincide with longitudinal extension lines of two faces 146 and 148, forming a circumference of the indoor unit 149. The coupler may be formed to engage with a groove, or may include, for example, a bolt and a nut, the type thereof is not particularly limited.

Figure 5:
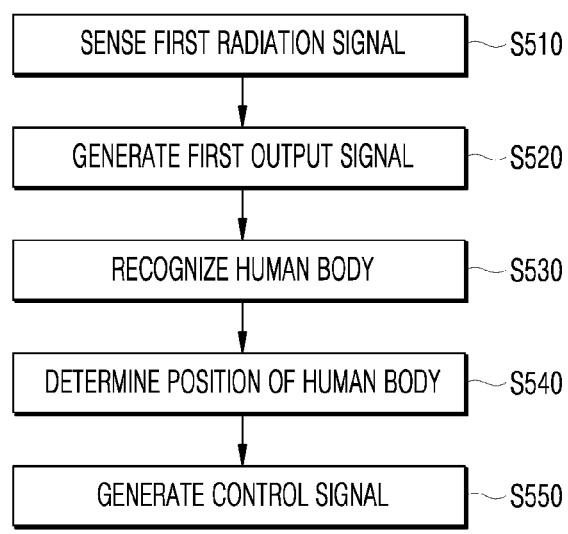
FIG. 5 is a flowchart illustrating a control method according to an embodiment of the present disclosure.

With reference to FIG. 5, a method for controlling an electronic device by the controller 200 having the configuration of FIG. 3 according to an embodiment of the present disclosure will be described.

The controller 200 may sense a radiation signal incident on a sensor from the sensor 210 (S510).

In one embodiment, an input signal incident on the sensor 210 may be infrared light, visible light, ultrasonic waves, electromagnetic waves, and light, as a radiation signal, and the type thereof is not particularly limited.

The radiation signal incident on the sensor 210 may be a radiation signal from the human bodies 313 and 315 positioned in an indoor space or an outdoor space of FIG. 1 or FIG. 2, or a radiation signal in which a radiation signal transmitted by the sensor 210 or a light emitting device is reflected from the human bodies.

The sensor 210 may generate an output signal based on a magnitude of the sensed radiation signal (S520).

In one embodiment, the output signal may be a one-dimensional signal, or a two-dimensional signal outputted from an array-type sensor composed of a plurality of elements.

The processor 220 may recognize a human body based on the output signal outputted from the sensor 210 (S530).

In one embodiment, the processor 220 may recognize the human body based on the output signal outputted in response to a change in an incident signal incident on the sensor 210. For example, the incident signal incident on the sensor 210 may change according to a movement of the human body, and the processor 220 may recognize the human body when the change in the incident signal exceeds a preset reference value.

In one embodiment, the processor 220 may determine a distance between the sensor 210 and the recognized human body based on the output signal of the sensor 210, and may determine a position of the human body based on the distance between the human body and the sensor 210 as being located in one of an indoor space or an outdoor space (S540). In this case, the sensor 210 may be a distance sensor such as, for example, a LIDAR, radar or ultrasonic sensor and the memory 230 may pre-store a distance from the sensor 210 to a boundary between the indoor space and the outdoor space.

The processor 220 may generate a control signal for controlling the electronic device based on the position of the human body (S550).

The control signal may be a signal for controlling the operation mode of the electronic device connected to the controller 200 via a wired or wireless network or whether to operate the electronic device.

For example, when the human body is recognized but it is determined that the position of the human body is in the exterior of the space where the electronic device is installed, the processor 220 may stop the operation of the electronic device or generate a control signal for changing the operation mode of the electronic device to an operation mode with low energy consumption. Alternatively, when it is determined that the position of the human body is in the interior of the space in which the electronic device is installed, the processor 220 may start the operation of the electronic device or change the operation mode of the electronic device to an operation mode in which the human body feels comfortable.

As another example, the control signal may be the number of the human bodies finally determined by the controller 200 to be positioned indoors, and the controller 200 may transmit, to the connected electronic device, the number of the human bodies determined to be positioned indoors.

In one embodiment, a configuration in which the sensor 210 is a radar and a radio wave radiated from an antenna of the sensor 210 is reflected to the human body and inputted to the sensor 210 as a radiation signal, and the processor 220 determines the position of the human body based on the output signal of the sensor 210 will be described with reference to FIG. 6.

Figure 6:
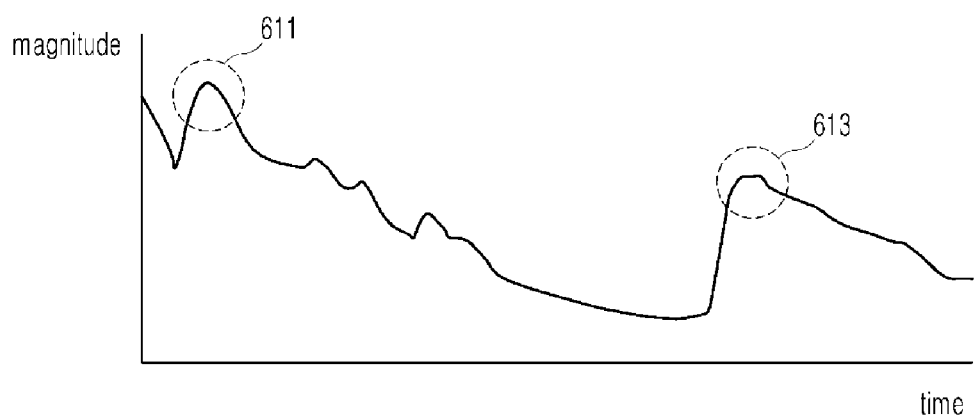
FIG. 6 is a diagram illustrating a method for sensing a human body present outdoors by a controller according to an embodiment of the present disclosure.

For example, when the output signal of the sensor 210 is as illustrated in FIG. 6, the processor 220 may determine a first echo 611 exceeding a preset reference magnitude as an echo reflected from a wall formed of glass. Thereafter, the processor 220 may determine, from an outputted output signal, a second echo 613 exceeding the preset reference magnitude as an echo reflected from the human body. Since the second echo 613 may be outputted after the echo 611 reflected from the wall formed of glass, the processor 220 may accordingly determine the human body to be positioned outdoors opposite the sensor based on the wall formed of glass.

For another example, when the output signal of the sensor 210 is as illustrated in FIG. 6, the processor 220 may determine the echo 613 that exceeds the preset reference magnitude to be reflected from the human body, and may determine a distance from the sensor 210 to the human body based on a time when the echo 613 reflected from the human body is received. When the distance from the sensor 210 to the human body exceeds a distance from the sensor 210 to the wall (the wall may be formed of glass) determined based on a preset reference value or a time when the echo 611 reflected from the wall is received, the processor 220 may determine the human body to be positioned outdoors opposite the sensor based on the wall.

In one embodiment, the processor 220 may recognize the floor area based on the output signal generated by the array-type sensor 210 composed of the plurality of elements in response to the incident signal, generate a floor model based on the floor area, and determine the position of the human body based on the floor model (S540).

Figure 7:
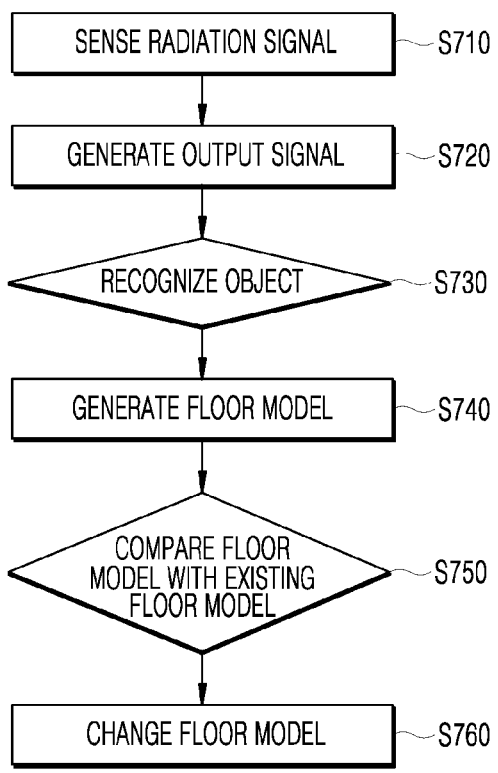
FIG. 7 is a diagram illustrating a method for recognizing a floor area of an indoor space by a controller according to an embodiment of the present disclosure.
Figure 8:
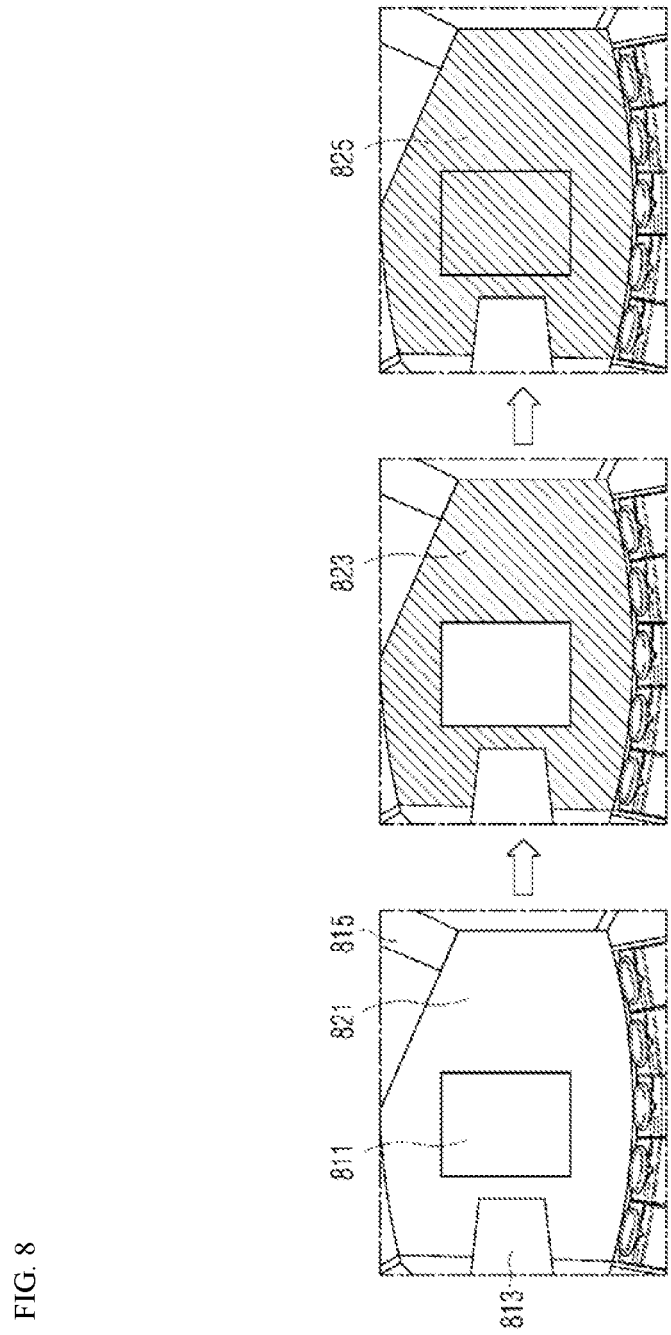
FIG. 8 is a diagram illustrating a method for generating or changing a floor model by a controller according to an embodiment of the present disclosure.
Figure 9:
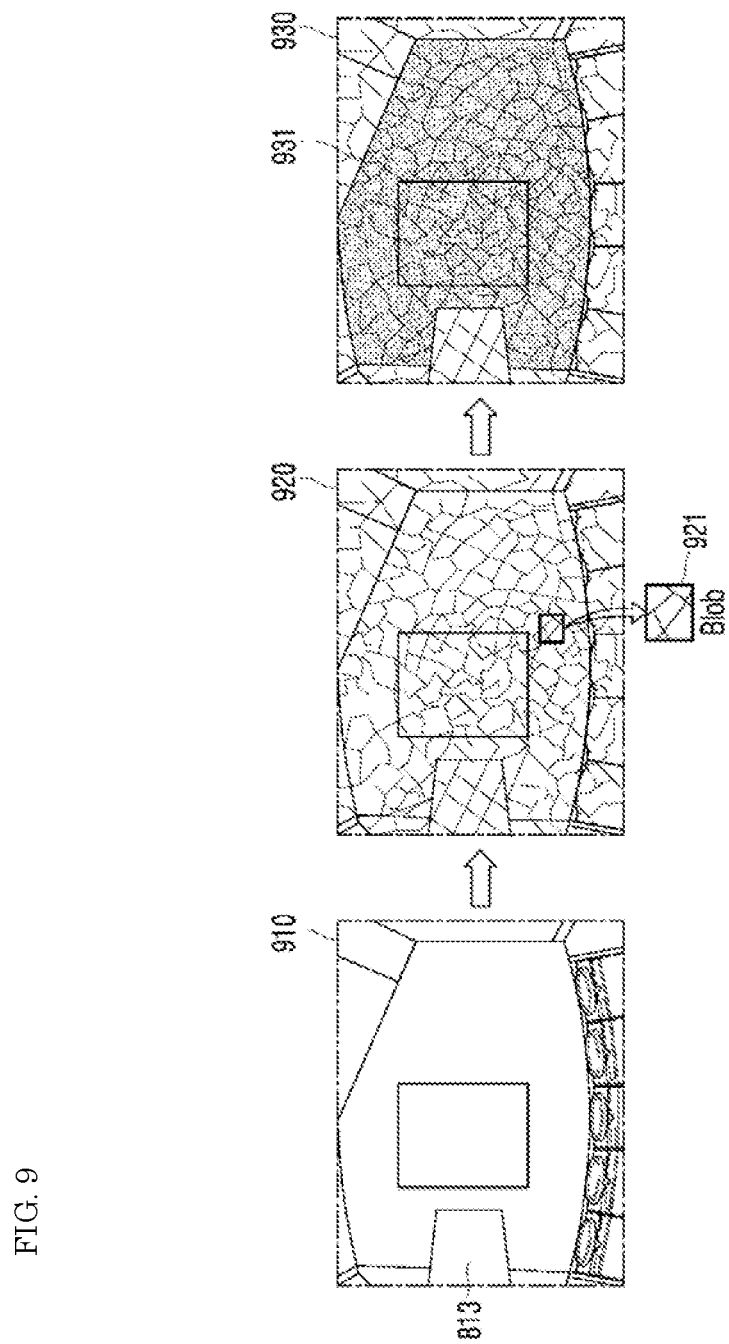
FIG. 9 is a diagram illustrating a method for recognizing a floor area of an indoor space by a controller according to an embodiment of the present disclosure.

With reference to FIGS. 7 to 9, a method for generating a floor model by the processor 220 will be described.

The array-type sensor 210 composed of the plurality of elements may sense a radiation signal incident on the sensor 210 (S710), and may generate an output signal in response to the radiation signal (S720). For example, the sensor 210 may be an RGB vision sensor; the radiation signal may be visible light; and the output signal may be a two-dimensional color image signal.

The processor 220 may recognize an object based on the output signal (S730).

The processor 220 may recognize the object by applying a machine learning-based learning model to the output signal. In one embodiment, the machine learning-based learning model that recognizes the object may include a CNN or Region Based CNN (R-CNN), Fast R-CNN, Faster R-CNN, Region based Fully Convolutional Network (R-FCN), a neural network having You Only Look Once (YOLO) model or a Single Shot multi-box Detector (SSD) structure. The processor may process an output signal in the formal of a two-dimensional image, recognize an object including a human body in the output signal, and identify a type of the object.

When it is determined that, among the recognized objects, there is no human body in the interior of the space where the electronic device is installed, the processor 220 may recognize the floor area in the output signal and generate a floor model (S740).

With reference to FIGS. 8 and 9, a method for recognizing the floor area in the output signal by the controller 200 will be described. FIGS. 8 and 9 illustrate a process in which, according to an embodiment of the present disclosure, the controller 200 or an indoor unit of an electronic device with which the controller 200 is implemented integrally is installed on a ceiling, and the floor area is recognized in an image signal of a bird's-eye view generated as an output signal from a vision sensor of the controller 200.

Referring to FIG. 8, in one embodiment, the processor 220 of the controller 200 may recognize a plurality of objects 811, 813, 815, and 821 by applying a deep-learning-based learning model to the image signal of the bird's-eye view.

Referring to FIG. 9, in another embodiment, the processor 220 may perform segmentation so as to divide a video signal 910 of the bird's-eye view into a plurality of blobs 921 or a plurality of segments as illustrated in FIG. 9 (920). The segmentation may be super-pixel based segmentation using a density-based spatial clustering of applications with noise (DBSCAN) clustering method, and a method thereof is not particularly limited.

In one embodiment, referring to FIG. 8, the processor 220 may recognize the floor area based on the learning model, and the recognized floor area may be a floor area 823 excluding an object 811 placed on a floor according to training data, or a floor area 825 including the object 811.

In another embodiment, referring to FIG. 9, the processor 220 may perform segmentation on the image signal of the bird's-eye view, and then may determine a blob 931 or a segment included in the floor area by applying the plurality of blobs 921 or the plurality of segments to the learning model (930).

Figure 10:
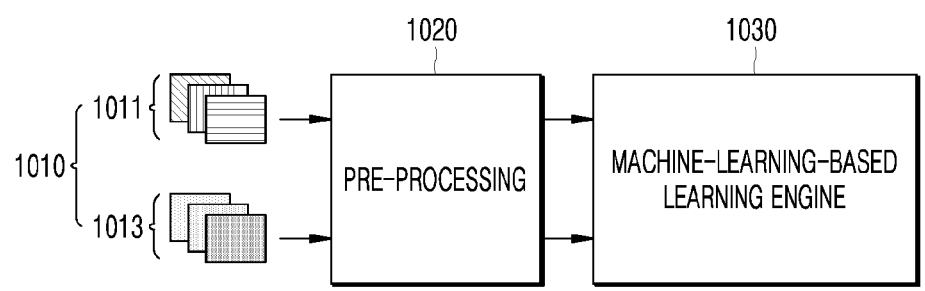
FIG. 10 is a diagram illustrating a method for recognizing a floor area of an indoor space by a controller according to an embodiment of the present disclosure.

With reference to FIG. 10, the learning model for determining the blob or segment included in the floor area will be described.

The learning model for determining the blob or segment included in the floor area is a deep-learning-based learning model including a deep neural network, or a learning model including an SVM classifier that divides a feature extracted from the blob or segment into a floor area and a non-floor area.

The learning model may be a model in which a machine-learning-based learning engine 1030 is trained with training data 1010 that is distinguished and labeled as either a floor image 1011 or a non-floor image 1013. That is, the training data 101 may be images that are classified into blobs and segments 1011 corresponding to the floor area and blobs and segments 1013 corresponding to the non-floor area by applying a mask image of the floor area to images photographed in various places where there are no people.

In one embodiment, the training data 1010 may be pre-processed before being used for learning. In the case of a deep-learning-based learning engine, pre-processing may include, for example, a plurality of convolution layers included in the learning model, a pulling layer, and an active function. The learning model including the SVM classifier may be a model in which the learning engine 1030 is trained with a feature vector in which texture information is quantified using a filter composed of kernels modified from a Gaussian function in each blob image or segment image.

The processor 220 may generate a floor model 825 based on the blobs or segments recognized as the floor area (930).

In one embodiment, the processor 220 may determine the blob or segment included in the floor area by applying the plurality of blobs 921 or the plurality of segments of the image signal of the bird's-eye view to the learning model, and then may determine whether an area that is not recognized as the floor area is the object 811 positioned in the floor area. For example, when the area that is not recognized as the floor area is determined as the object 811 positioned in the floor area by applying a trained learning model from an image of, for example, a table, a carpet, and a sofa, to the area that is not recognized as the floor area, the processor 220 may incorporate the object 811 positioned in the floor area into the floor area to generate the floor model 825.

In another embodiment, when a circumference of an object that is not recognized as the floor area meets an area recognized as the floor area by greater than a certain reference value, the processor 220 may incorporate the object 811 into the floor area to generate the floor model 825. Therefore, columns 811 and 815 may not be included in the floor model 825, and a table 811, carpet, sofa, and the like positioned on the floor may be included in the floor model 825.

The controller 200 may change the floor model periodically or non-periodically.

When the object is not recognized in the image photographed by the sensor, or there is no object determined to be a human body among the recognized objects (S730), the controller 200 may generate a temporary floor model (S740), and may compare the generated temporary floor model with an existing stored floor model (S750). When a difference therebetween is greater than or equal to a preset reference value, the controller 200 may change the existing floor model based on the temporary floor model (S760).

Therefore, even when a new item (table, carpet, or the like) other than the human body is installed in the space where the electronic device is installed, the floor model may be updated based on the new facility to accurately determine a position of the human body as being located in one of an indoor space or an outdoor space.

Figure 11:
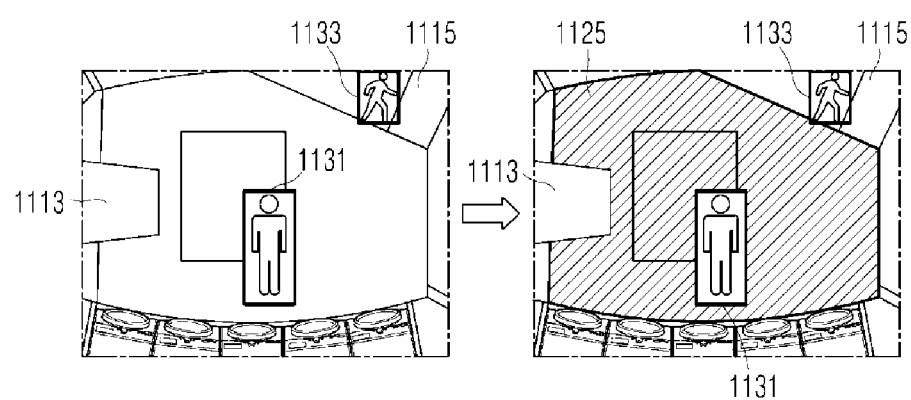
FIG. 11 is a diagram illustrating a method for determining a position of a human body based on a floor model by a controller according to an embodiment of the present disclosure.

With reference to FIG. 11, a method for determining, by the controller 200, the position of the human body recognized based on the generated floor model as being located in one of an indoor space or an outdoor space will be described.

FIG. 11 illustrates a configuration in which the controller 200 is installed on the ceiling; the controller 200 is implemented as part of the electronic device; or the electronic device integrally coupled to the controller 200 is installed on the ceiling, and the sensor 210 generates the image of the bird's-eye view as the output signal in response to the radiation signal.

The controller 200 may recognize objects 1113, 1115, 1131, and 1133 in the output signal by applying the machine-learning-based learning model to the output signal. The machine-learning-based learning model that recognizes the object may include a CNN or R-CNN, Fast R-CNN, Faster R-CNN, R-FCN, and a neural network having YOLO or SSD structure.

The controller 200 may identify types of the recognized objects to determine human bodies 1131 and 1133, and may estimate areas of the human bodies 1131 and 1133. For example, the areas of the human bodies 1131 and 1133 may be estimated as a bounding box. Alternatively, by applying the machine-learning-based learning model to images of the human bodies 1131 and 1133, the controller 200 may estimate openposes and denseposes of the human bodies 1131 and 1133, or may estimate exact areas and portions of the human bodies 1131 and 1133 by performing instance segmentation. In one embodiment, a training model for estimating an openpose may include a convolution pose machine (CPM) which is a pose estimator that localizes a keypoint, or a training model for estimating a densepose may be a deep learning-based learning model as a learning model that maps two-dimensional images of the human bodies 1131 and 1133 to three-dimensional surface models of the human bodies 1131 and 1133, and may structurally include a region-based model and a fully convolutional network. A learning model for performing the instance segmentation may be a mask RCNN method of a deep learning model. In another embodiment, the areas of the human bodies and may be estimated by dividing an image into multiple resolutions in pre-processing and post-processing processes based on a machine learning model, extracting an eigenvector from each of the divided multi-resolutions and synthesizing a result of forming a segmentation map.

Referring to FIG. 11, when the areas of the human bodies 1131 and 1133 are estimated as the bounding box, the controller 200 may compare the bounding box with the stored floor model 1125 to determine the positions of the human bodies 1131 and 1133 as being located in one of an indoor space or an outdoor space. For example, when the area where the bounding box and the floor model 1125 overlap each other is greater than or equal to a preset reference value, the human body may be determined to be positioned indoors. When the area where the bounding box and the floor model 1125 overlap each other may be less than the preset reference value, the human body may be determined to be positioned outdoors. Alternatively, when both vertex coordinates of a lower end of the bounding box are present in the floor model 1125, the human body may be determined to be positioned indoors.

As another example, when the position of the foot of the human body estimated as the open pose and the position of the foot of the human body estimated as the densepose are present in the floor model 1125, the human body may be determined to be positioned indoors. When the position of the foot is present outside the floor model 1125, the human body may be determined to be positioned outdoors.

Alternatively, a size of an area where the human body estimated as the open pose, the human body estimated as the densepose, and the human body estimated as the instance segmentation overlap the floor model 1125 may be compared with the preset reference value to determine the position of the human body as being located in one of an indoor space or an outdoor space.

Figure 12:
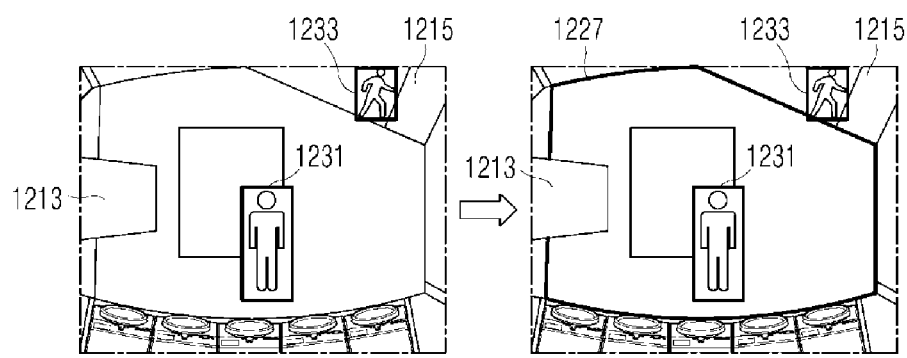
FIG. 12 is a diagram illustrating a method for determining a position of a human body based on a boundary between an indoor space and an outdoor space by a controller according to an embodiment of the present disclosure.

With reference to FIG. 12, a method for determining, by the controller 200, the position of the recognized human body as being located in one of an indoor space or an outdoor space based on the boundary between the indoor space and the outdoor space will be described.

FIG. 12 illustrates a configuration in which the controller 200 is either installed on the ceiling; the controller 200 is implemented as part of the electronic device; or the electronic device integrally coupled to the controller 200 is installed on the ceiling, and the sensor 210 generates the image of the bird's-eye view as the output signal in response to the radiation signal.

As described with reference to FIG. 11, the controller 200 may recognize objects 1213, 1215, 1231, and 1233 in the output signal, and may estimate types of the objects. In addition, the controller 200 may recognize human bodies 1231 and 1233, and may estimate areas of the human bodies 1231 and 1233 using a method of the bounding box, openpose, densepose, and instance segmentation.

The controller 200 may detect edges present in the output signal by using, for example, the machine-learning-based learning model, filter image processing, or second-derivative filter-based image processing. The machine learning-based learning model may include a CNN-based neural network.

The controller 200 may determine a point vertically corresponding to the position of the sensor 210 in the output signal, and a virtual line extending from the point corresponding to the position of the sensor 210 in a peripheral radial direction and an orthogonal component may extend edges that are greater than or equal to a reference value to determine a boundary 1227 between the indoor space and the outdoor space.

The controller 200 may determine whether the estimated human bodies 1231 and 1233 are in the same area as the point corresponding to the position of the sensor 210 based on the boundary 1227 or in the opposite area, and may determine positions of the human bodies 1231 and 1233 as being located in one of an indoor space or an outdoor space. Alternatively, when the position of the foot of the human body estimated as the open pose, the position of the foot of the human body estimated as the densepose, and both coordinates of the lower end of the bounding box are present in the boundary 1227, the human body may be determined to be positioned indoors.

The controller described with reference to FIGS. 11 and 12 exemplifies the output signal of the vision sensor, but the method described with reference to FIGS. 11 and 12 may be applied to the output signal of the array-type sensor such as, for example, a thermal image sensor, a two-dimensional ultrasonic array sensor or a two-dimensional radar array sensor.

As another example, another method for determining whether the position of the recognized human body is being located in one of an indoor space or an outdoor space based on a radiation signal sensed by the sensor 210 will be described.

The controller 200 may store a result of recognizing the human body based on the radiation signal sensed by the sensor 210 in the memory 230, and then may identify whether the pre-stored floor model is present. When the floor model is present, the controller 200 may; determine whether the human body recognized based on the floor model is present in the non-floor area, that is, the outdoor space; reflect the human body outdoors in the human body recognition result stored in the memory 230; and generate a control signal based on the final recognition result, or transmit the final recognition result (the number of human bodies positioned indoors) to the electronic device.

Figure 13:
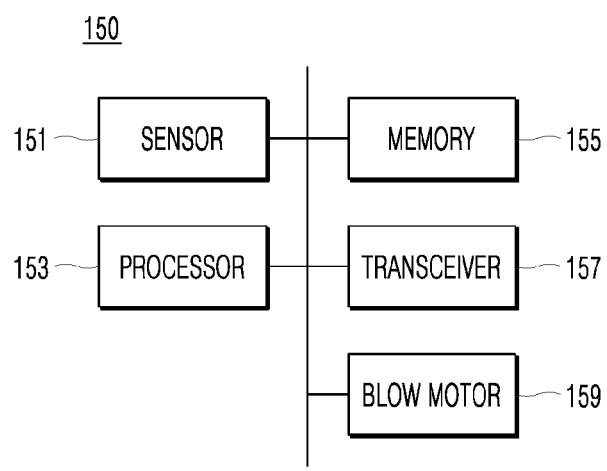
FIG. 13 is a block diagram illustrating a configuration of an electronic device that forms an air flow according to an embodiment of the present disclosure.
Figure 14:
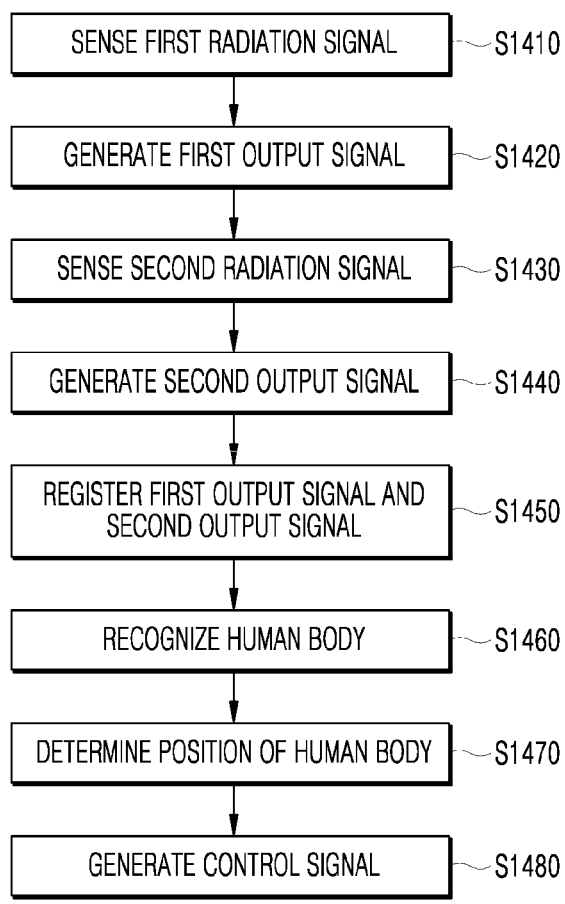
FIG. 14 is a flowchart illustrating a method for controlling an electronic device that forms an air flow according to an embodiment of the present disclosure.
Figure 15:
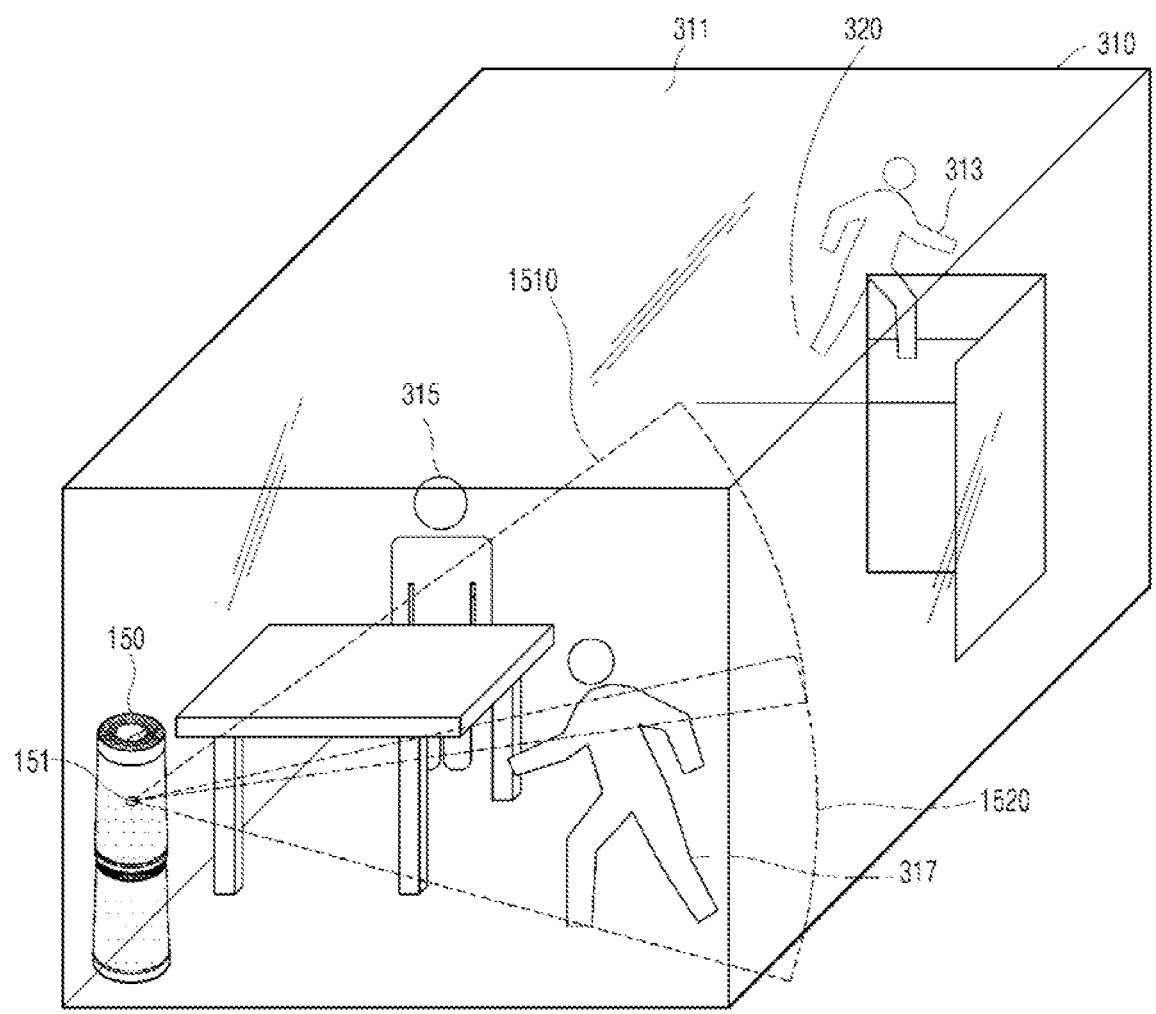
FIG. 15 is a diagram illustrating a method for controlling an electronic device that forms an air flow according to an embodiment of the present disclosure.

With reference to FIGS. 13 to 15, a configuration in which the controller operates integrally coupled to the electronic device that forms an air flow will be described. The electronic device may be, for example, an air conditioner, an air purifier, a convector, a hot-air blower, or the like. In the following, a description overlapping with the description of FIGS. 1 to 12 will be omitted.

The electronic device 150 may include a sensor 151 configured to generate an output signal by sensing a radiation signal incident on a sensor, a processor configured to determine, based on the output signal of the sensor, a position of a human body being located in one of an indoor space or an outdoor space, and generate a control signal for controlling an electronic device, a code configured to operate the processor 153, a memory 155 configured to store at least a part of calculation data of the processor 153 or at least a part of the output signal of the sensor 151, a transceiver 157 configured to transmit a control signal to the electronic device, and a blower motor 159 configured to form an air flow.

FIG. 14 is a flowchart illustrating a method for controlling the electronic device 150 that forms an air flow according to an embodiment of the present disclosure.

The electronic device 150 may sense a radiation signal incident on the sensor 151 from the sensor 151 (S1410).

In one embodiment, an input signal incident on the sensor 151, as a radiation signal, may be infrared light, visible light, ultrasonic waves, electromagnetic waves, and light and a type thereof is not particularly limited.

The radiation signal incident on the sensor 151 may be a radiation signal radiated from a human body positioned indoors or outdoors, or a radiation signal in which a radiation signal transmitted by the sensor 210 or a light emitting device is reflected from the human body.

The sensor 151 may generate an output signal based on a magnitude of the sensed radiation signal (S1420).

In one embodiment, the output signal may be a one-dimensional signal, or a two-dimensional signal outputted from an array-type sensor composed of a plurality of elements.

The processor 153 may recognize the human body based on the output signal outputted from the sensor 151.

In one embodiment, the processor 153 may recognize the human body based on the output signal outputted in response to a change in an incident signal incident on the sensor 151. For example, the incident signal incident on the sensor 151 may change according to a movement of the human body, and the processor 153 may recognize the human body when the change in the incident signal exceeds a preset reference value. Alternatively, when the output signal of the sensor 151 is a two-dimensional image signal generated by the array-type sensor 151, the processor 153 may recognize the human body by applying the machine-learning-based learning model to the output signal.

When the sensor 151 is not capable of photographing an indoor space where the electronic device 150 is positioned at one time, the processor 153 may register a plurality of output signals generated in response to a plurality of radiation signals incident on the sensor 151 (S1450). The sensor 151 may sense a first radiation signal (S1410), generate a first output signal in response to the first radiation signal (S1420), sense a second radiation signal incident on the sensor 151 at a time different from a time when the first radiation signal is incident (S1430), and generate a second output signal in response to the second radiation signal (S1440).

Referring to FIG. 15, the electronic device 150 may be positioned on the floor, and the sensor 151 of the electronic device 150 may not photograph the indoor space where the electronic device 150 is positioned at one time due to one-time output signal generation. Therefore, the plurality of output signals may be generated in response to the plurality of radiation signals 1510 and 1520 incident on the sensor 151 at different times, and the processor 153 may register the plurality of output signals.

The electronic device 150 may recognize the human bodies 313, 315, and 317 in the registered output signals (S1460), and determine the positions of the human bodies 313, 315, and 317 as being located in one of an indoor space or an outdoor space (S1470). The machine learning-based learning model that recognizes the object may include a CNN or R-CNN, Fast R-CNN, Faster R-CNN, R-FCN, and a neural network having YOLO or SSD structure The method for determining the positions of the human bodies 313, 315, and 317 as being located in one of an indoor space or an outdoor space is the same as the method of the controller described above, and thus a detailed description thereof will be omitted.

The processor 153 may generate a control signal for controlling the electronic device based on the position of the human body recognized in the registered output signals (S1480).

The control signal may be a control signal related to the blower motor 159 as a signal for controlling an operation mode of the electronic device 150 or whether to operate the electronic device.

For example, when it is determined that the position of the human body is present in the exterior of the space in which the electronic device is installed, the processor 153 may stop the operation of the electronic device 150 to stop the operation of the blower motor 159, or may change the operation mode of the electronic device 150 to an operation mode with low energy consumption to generate a control signal for reducing the operation of the blower motor 159. Alternatively, when it is determined that the position of the human body is present in the interior of the space where the electronic device is installed, the processor 153 may start the operation of the electronic device 150, or may change the operation mode of the electronic device 150 to an operation mode in which the human body feels comfortable to generate a control signal for increasing the operation of the blower motor 159.

The present disclosure described above may be embodied as computer-readable codes on a medium on which a program is recorded. The computer-readable medium may include all kinds of recording devices in which computer-readable data is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc. In addition, the computer may include a controller or a processor of an electronic device with which the controller is implemented integrally or which is connected to the controller.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the terms "a/an" and "the" include both singular and plural references, unless the context clearly states otherwise. Also, it should be understood that any numerical range recited in the present disclosure is intended to include all sub-ranges subsumed therein (unless expressly indicated otherwise) and accordingly, the disclosed numeral ranges include every individual value between the minimum and maximum values of the numeral ranges.

The steps constituting the method according to the present disclosure may be performed in an appropriate order unless a specific order is described or otherwise specified. That is, the present disclosure is not necessarily limited to the order in which the steps are recited. All examples described in the present disclosure or the terms indicative thereof ("for example", "such as") are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and form factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for controlling an electronic device, the method comprising:
    sensing, by a sensor of a controller, a first radiation signal incident on the sensor;
    generating, by the sensor, a first output signal based on the first radiation signal;
    recognizing, by a processor of the controller, a human body based on the first output signal;
    determining, by the processor, a position of the human body as being located in one of an indoor space or an outdoor space based on the first output signal; and
    generating, by the processor, a control signal for controlling the electronic device based on the position of the human body,
    wherein the controller is connected to the electronic device via a wired or wireless network, and
    wherein the determining of the position of the human body further comprises:
        detecting, in the first output signal, an echo reflected by a wall;
        detecting, in the first output signal, an echo reflected by the human body; and
        determining the position of the human body based on the echo reflected by the wall and the echo reflected by the human body.

2. A method for controlling an electronic device, the method comprising:
    sensing, by a sensor of a controller, a first radiation signal incident on the sensor;
    generating, by the sensor, a first output signal based on the first radiation signal;
    recognizing, by a processor of the controller, a human body based on the first output signal;
    determining, by the processor, a position of the human body as being located in one of an indoor space or an outdoor space based on the first output signal;
    generating, by the processor, a control signal for controlling the electronic device based on the position of the human body;
    sensing, by the sensor, a second radiation signal incident on the sensor before sensing the first radiation signal;
    generating, by the sensor, a second output signal based on the second radiation signal;
    recognizing, by the processor, a first floor area based on the second output signal;
    generating, by the processor, a floor model based on the recognized first floor area; and
    determining the position of the human body based on the floor model and the first output signal,
    wherein the controller is connected to the electronic device via a wired or wireless network.

3. The method according to claim 2, further comprising:
    sensing, by the sensor, a third radiation signal incident on the sensor after sensing the first radiation signal;
    generating, by the sensor, a third output signal based on the third radiation signal;
    recognizing, by the processor, a second floor area based on the third output signal;
    generating, by the processor, a temporary floor model based on the recognized second floor area; and
    changing, by the processor, the floor model based on the temporary floor model.

4. The method according to claim 2, further comprising recognizing the first floor area by applying, to the second output signal, a machine-learning-based learning model trained with training data in which floor images and non-floor images are distinguished from each other and labeled.

5. The method according to claim 4, further comprising:
    determining, by the processor, whether an area that is not recognized as the first floor area is an object positioned in the first floor area in the second output signal; and
    generating, by the processor, the floor model including at least a part of the object positioned in the first floor area based on a result of determining whether the area that is not recognized as the first floor area is the object positioned in the first floor area.

6. The method according to claim 2, wherein the first output signal is an image signal of a bird's-eye view generated in response to the first radiation signal incident on the sensor, and
    wherein the sensor is an array-type vision sensor having a wide-angle lens.

7. A controller, comprising:
    a sensor configured to sense a first radiation signal incident on the sensor;
    a processor; and
    a memory electrically connected to the processor, and configured to store codes executable by the processor, wherein, the memory stored codes are configured to, when executed by the processor, cause:
the sensor to generate a first output signal based on the first radiation signal sensed by the sensor, and
the processor to:
recognize a human body based on the first output signal,
determine a position of the human body as being located in one of an indoor space or an outdoor space based on the first output signal, and
generate a control signal for controlling an electronic device based on the position of the human body,
wherein the controller is connected to the electronic device via a wired or wireless network,
wherein the sensor is configured to sense a second radiation signal before the first radiation signal is sensed, and
wherein the memory further stores codes configured to, when executed by the processor, cause:
the sensor to generate a second output signal based on the second radiation signal, and
the processor to:
generate a floor model based on a first floor area recognized based on the second output signal, and
determine the position of the human body based on the floor model and the first output signal.

8. The controller according to claim 7, wherein senor is configured to sense a third radiation signal after the first radiation signal, and
wherein the memory further stores codes configured to, when executed by the processor, cause:
the sensor to generate a third output signal based on the third radiation signal, and
the processor to:
generate a temporary floor model based on a second floor area recognized based on the third output signal, and
change the floor model based on the temporary floor model.

9. The controller according to claim 7, wherein the memory further stores codes configured to, when executed by the processor, cause the processor to recognize the first floor area by applying, to the second output signal, a machine-learning-based learning model trained with training data in which floor images and non-floor images are distinguished from each other and labeled.

10. The controller according to claim 7, wherein the memory further stores codes configured to, when executed by the processor, cause:
the sensor to generate an image signal of a bird's-eye view as the second output signal in response to the second radiation signal incident on the sensor, wherein the sensor is an array-type sensor having a wide-angle lens, and
the processor to recognize the first floor area based on the second output signal.

11. A controller, comprising:
a sensor configured to sense a first radiation signal incident on the sensor;
a processor; and
a memory electrically connected to the processor, and configured to store codes executable by the processor, wherein, the memory stored codes are configured to, when executed by the processor, cause:
the sensor to generate a first output signal based on the first radiation signal sensed by the sensor, and
the processor to:
recognize a human body based on the first output signal,
determine a position of the human body as being located in one of an indoor space or an outdoor space based on the first output signal, and
generate a control signal for controlling an electronic device based on the position of the human body,
wherein the controller is connected to the electronic device via a wired or wireless network,
wherein the controller has an outer surface with five faces connected to one another, and
wherein longitudinal extension lines of two adjacent faces among the five faces are perpendicular to each other.

12. The controller according to claim 11, further comprising:
a communication line configured to transmit the control signal; and
a connector formed at one end of the communication line,
wherein the memory further stores a code configured to, when executed by the processor, cause the processor to transmit the control signal to an external device connected to the connector via the communication line, and
wherein the longitudinal extension lines of the two faces perpendicular to each other are mechanically coupled to the external device.

13. An electronic device that produces air flow, the electronic device comprising:
a blower motor configured to produce air flow;
a sensor configured to sense a first radiation signal incident on the sensor;
a processor; and
a memory electrically connected to the processor, the memory configured to store codes executable by the processor, wherein the memory stored codes are configured to, when executed by the processor, cause:
the sensor to generate a first output signal based on the first radiation signal sensed by the sensor, and
the processor to:
recognize a human body based on the first output signal,
determine a position of the human body as being located in one of an indoor space or an outdoor space based on the first output signal, and
generate a signal for controlling an operation mode relating to the blower motor based on the position of the human body,
wherein the sensor is configured to sense a second radiation signal before the first radiation signal is sensed, and
wherein the memory further stores codes configured to, when executed by the processor, cause:
the sensor to generate a second output signal based on the second radiation signal, and
the processor to:
generate a floor model based on a first floor area recognized based on the second output signal, and
determine the position of the human body based on the floor model and the first output signal.

* * * * *